United States Patent
Livescu et al.

(10) Patent No.: US 10,822,942 B2
(45) Date of Patent: Nov. 3, 2020

(54) TELEMETRY SYSTEM INCLUDING A SUPER CONDUCTOR FOR A RESOURCE EXPLORATION AND RECOVERY SYSTEM

(71) Applicants: Silviu Livescu, Calgary (CA); Jeyhun Y. Najafov, Calgary (CA); Thomas J. Watkins, Calgary (CA)

(72) Inventors: Silviu Livescu, Calgary (CA); Jeyhun Y. Najafov, Calgary (CA); Thomas J. Watkins, Calgary (CA)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/895,613

(22) Filed: Feb. 13, 2018

(65) Prior Publication Data

US 2019/0249544 A1    Aug. 15, 2019

(51) Int. Cl.
| | | |
|---|---|---|
| *E21B 47/12* | (2012.01) | |
| *E21B 17/00* | (2006.01) | |
| *H01B 12/00* | (2006.01) | |
| *H01B 11/22* | (2006.01) | |
| *H02G 3/04* | (2006.01) | |
| *E21B 47/135* | (2012.01) | |
| *E21B 49/08* | (2006.01) | |
| *E21B 47/06* | (2012.01) | |

(Continued)

(52) U.S. Cl.
CPC .......... *E21B 47/12* (2013.01); *E21B 17/003* (2013.01); *E21B 47/135* (2020.05); *H01B 11/22* (2013.01); *H01B 12/00* (2013.01); *H02G 3/0462* (2013.01); *E21B 47/06* (2013.01); *E21B 47/07* (2020.05); *E21B 47/09* (2013.01); *E21B 49/08* (2013.01)

(58) Field of Classification Search
CPC ............................ E21B 47/12; E21B 17/003
See application file for complete search history.

(56) References Cited

U.S. PATENT DOCUMENTS

| | | | |
|---|---|---|---|
| 5,495,547 A | 2/1996 | Rafie et al. | |
| 6,369,718 B1 * | 4/2002 | Mathieu | E21B 47/12 340/853.7 |
| 9,518,433 B2 | 12/2016 | Naumann et al. | |

(Continued)

FOREIGN PATENT DOCUMENTS

WO    2009064758 A2    5/2009

OTHER PUBLICATIONS

Blanco et al "Coiled Tubing Telemetry System Improvements with Real-Time Tension, Compression, and Torque Date Monitoring" Presented at the Abu Dhabi International Petroleum Exhibition and Conference in Abu Dahabi, UAE, Nov. 7-10, 2016 SPE-184754-MS (pp. 1-12).

(Continued)

*Primary Examiner* — Kristyn A Hall
(74) *Attorney, Agent, or Firm* — Cantor Colburn LLP

(57) ABSTRACT

A telemetry system for a resource exploration and recovery system including a tubular defining a flow bore, and a superconductor wire disposed within the flow bore. A resource exploration and recovery system including a first system, a second system fluidically connected to the first system, and a telemetry system operatively connected to the first system extending into the second system, the telemetry system including a tubular defining a flow bore, and a superconductor wire disposed within the flow bore.

16 Claims, 3 Drawing Sheets

(51) Int. Cl.
*E21B 47/09* (2012.01)
*E21B 47/07* (2012.01)

(56) References Cited

U.S. PATENT DOCUMENTS

| | | | |
|---|---|---|---|
| 9,644,435 | B2 | 5/2017 | Naumann |
| 2005/0263281 | A1 | 12/2005 | Lovell et al. |
| 2008/0142212 | A1* | 6/2008 | Hartog .................. E21B 17/025 166/250.01 |
| 2009/0120689 | A1* | 5/2009 | Zaeper ..................... E21B 47/18 175/40 |
| 2010/0089584 | A1* | 4/2010 | Burns ................ E21B 43/2401 166/302 |
| 2012/0013893 | A1 | 1/2012 | Maida et al. |
| 2016/0069146 | A1 | 3/2016 | Livescu et al. |
| 2016/0258231 | A1 | 9/2016 | Naumann et al. |
| 2016/0314420 | A1 | 10/2016 | Livescu et al. |

OTHER PUBLICATIONS

Livescu et al. "10 Years of Continuous Technology Development and Field Application of a Coiled Tubing Telemetry System: Past, Present and Future" Presented at the SPE Annual Technical Conference and Exhibition, San Antonio, Texas, USA, Oct. 9-11, 2017. SPE-187374-MS (pp. 1-19).

Livescu et al. "A critical review of the coiled tubing friction-reducing technologies in extended-reach wells. Part 1: Lubricants." Journal of petroleum science and engineering 157 (2017): 747-759.

Livescu et al. "A critical review of the coiled tubing friction-reducing technologies in extended-reach wells. Part 2: vibratory tools and tractors." Journal of Petroleum Science and Engineering 166 (2018): 44-54.

Livescu et al. "Novel 2 1/8 in. Real-Time Downhole Data Monitoring System for Coiled Tubing Operations" Presented at the SPE Annual Technical Conference and Exhibition, Houston, Texas, USA, Sep. 28-30, 2015. SPE-174850-MS (pp. 1-15).

Livescu et al. "2 1/8-in. Intelligent Coiled Tubing System Improves Operational Efficiency"; Presented at the International Petroleum Technology Conference held in Doha, Qatar, Dec. 7-9, IPTC-18294-MS. (pp. 1-12).

International Search Report and Written Opinion for International Application No. PCT/US2019/017583; International filing Date Feb. 12, 2019; Report dated May 24, 2019 (pp. 1-9).

* cited by examiner

TELEMETRY SYSTEM INCLUDING A SUPER CONDUCTOR FOR A RESOURCE EXPLORATION AND RECOVERY SYSTEM

BACKGROUND

In the resource exploration and recovery industry, boreholes are formed in a formation for the purpose of testing and recovering formation fluids. A tubular is guided into the borehole for the purpose of treating the formation and/or recovering formation fluids. Often times, various sensors may be arranged along the tubular for the purpose of sensing various parameters of interest. The sensors are coupled to a surface system through a conductor. The conductor may provide power from the surface system to the sensors and carry signals from the sensors. In addition to sensors, the tubular may support one or more tools that also receive power from the surface system.

Often time the tubular may take the form of coiled tubing utilized as a running string. In some cases, the coiled tubing may take the form of Telecoil® which includes a conductor that may transmit power and data from, for example, the sensors to a surface system. Current conductors are capable of delivering up to about 10 amperes to sensors and/or tools. The current conductors impose limits on the number, type and location of sensors and tools that are utilized in the borehole. Increasing current carrying capability of the conducts would lead to an increase in conductor diameter. Increasing conductor diameter imposes other limits on borehole operations. For example, using larger diameter conductors would detract from space that could be utilized for tools, valves, and the passage of fluid. Accordingly, the art would be appreciative of a conductor that could carry more current without requiring an increase in diameter.

SUMMARY

Disclosed is a telemetry system for a resource exploration and recovery system including a tubular defining a flow bore, and a superconductor wire disposed within the flow bore.

Also disclosed is a resource exploration and recovery system including a first system, a second system fluidically connected to the first system, and a telemetry system operatively connected to the first system extending into the second system, the telemetry system including a tubular defining a flow bore, and a superconductor wire disposed within the flow bore.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
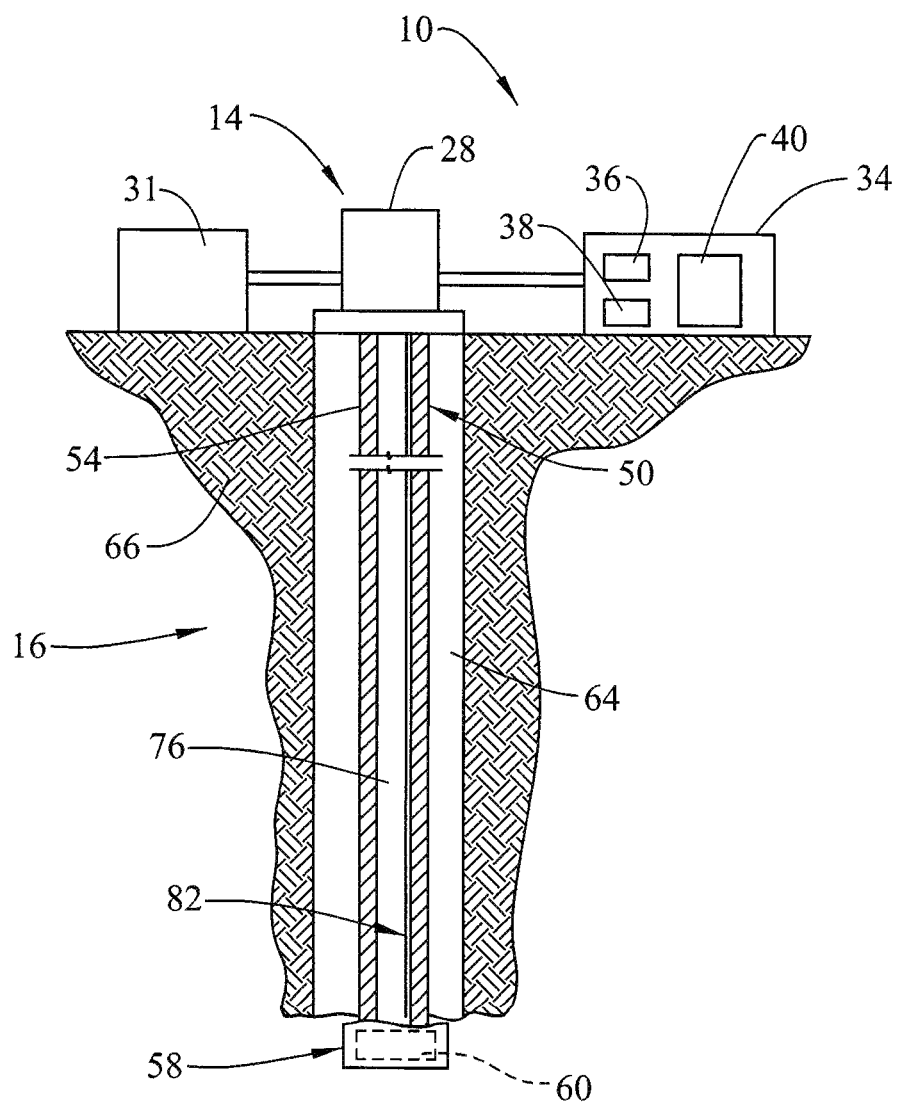
FIG. 1 depicts a resource exploration and recovery system having a telemetry system, in accordance with an aspect of an exemplary embodiment.

A resource exploration and recovery system, in accordance with an aspect of an exemplary embodiment, is indicated generally at 10 in FIG. 1. Resource exploration and recovery system 10 includes a first system 14, which may be a surface system (not separately labeled) and a second system 16, which may be a downhole system (also not separately labeled). First system 14 may include a well head 28 that may be operatively coupled to an injection unit 31 and a control unit 34. Injection unit 31 may control injection of downhole fluids such as, for example, drilling mud, treatment fluids and the like.

Control unit 34 may provide operators with an ability to monitor and interact with downhole operations. Control unit 34 may include a processor 36, a storage device 38 and a telemetry system 40 that extends into second system 16. A tubular string 50, which may take the form of coiled tubing 54, extends from well head 28 to a bottom hole assembly (BHA) 58. BHA 58 may include one or more electric tools 60, such as a mud motor, and one or more sensors 62 (FIG. 2) that may include a temperature sensor, a pressure sensor, a distance sensor, a force sensor, a torque sensor, a pH sensor, an azimuth sensor, and the like. Tubular string 50 extends into a borehole 64 formed in a formation 66.

Figure 2:
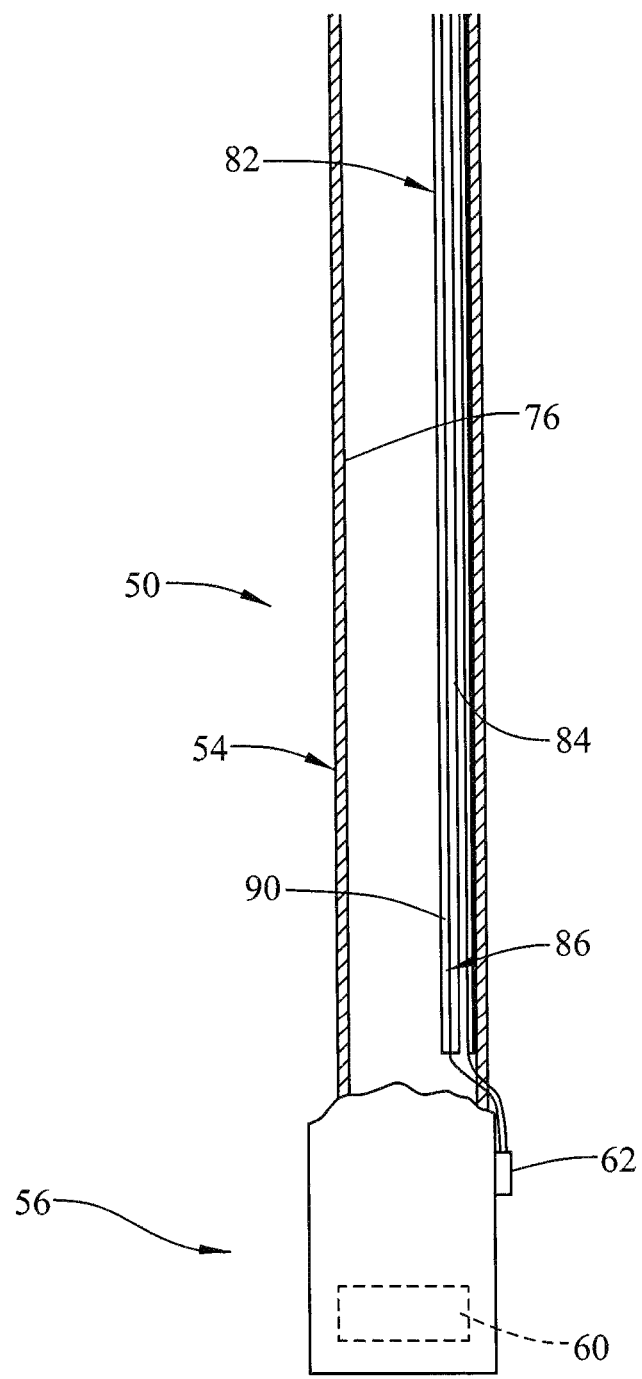
FIG. 2 depicts a side cross-sectional view of a tubular string portion of the telemetry system of FIG. 1, in accordance with an aspect of an exemplary embodiment.
Figure 3:
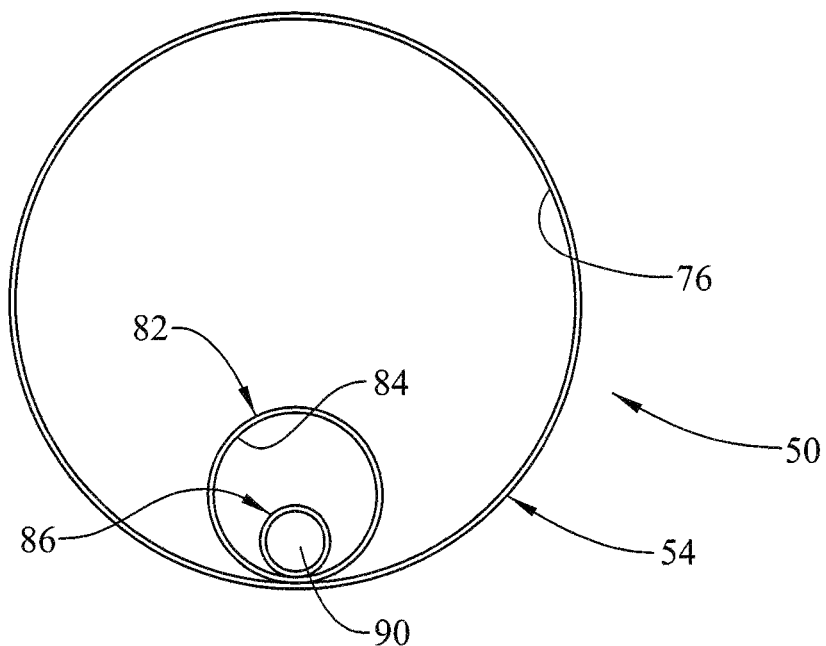
FIG. 3 depicts an axial cross-sectional view of the tubular string of FIG. 2, in accordance with an aspect of an exemplary embodiment.

In an embodiment, coiled tubing 54 includes a central flow bore 76 through which passes a protective tube 82. In accordance with an exemplary embodiment, protective tube 82 may be substantially rigid and may be formed from a corrosion resistant steel alloy such as, for example, Inconel or an Inconel alloy. As shown in FIGS. 2 and 3, protective tube 82 includes a passage 84 that is receptive of a superconductor wire 86 that may operatively connect, for example, telemetry system 40 with electrically operated tool(s) 60 and sensors 62. In accordance with an aspect of an exemplary embodiment, superconductor wire 86 may take the form of a nano-carbon tube 90 that may promote telemetry transmission, in the form of electrical energy between telemetry system 40 and electrically operated tool(s) 60 and/or sensors 62.

Figure 4:
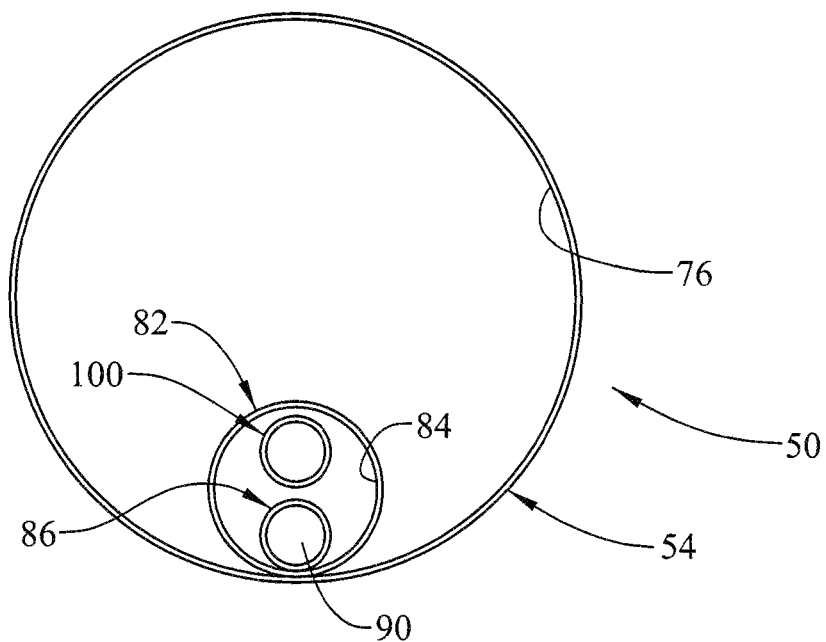
FIG. 4 depicts an axial cross-sectional view of a tabular string, in accordance with another aspect of an exemplary embodiment.

In accordance with another exemplary aspect depicted in FIG. 4, superconductor wire 86 and an optical fiber conductor 100 extend through passage 84 between telemetry system 40 and BHA 58. Providing both superconductor wire 86 and optic fiber 100 allows for a dual telemetry system. Superconductor wire 86 may provide power to and transmits signals between BHA 58 and telemetry system 40 while optical fiber 100 may transmit information regarding sensed temperature and/or acoustics along a length of tubular string 50. The use of superconductor wire 86 provides greater flexibility in the number and type of sensors that may be connected to the telemetry system. In addition to promoting communication from the sensors, the superconductor wire possess a current carrying capacity that allows for a greater variation and number of electrically powered tools at the BHA.

In accordance with an exemplary embodiment, superconductor wire 86 may include a modulus of rigidity that is less than about 74 GPa. In accordance with another aspect of an exemplary embodiment, superconductor wire 86 may include a modulus of rigidity of greater than about 80 GPa. In accordance with yet another aspect of an exemplary embodiment, superconductor wire 86 may include a diameter that is less than about 0.125-inches (3.2-millimeters). The modulus of rigidity and diameter impact how superconductor wire 86 may be introduced into coiled tubing 54.

Further, superconductor wire 86 may take the form of a nano-carbon wire having a strength that is greater than steel conductors and copper conductors. For example, superconductor wire may possess a strength of about 1 GPA. Further, in accordance with an exemplary aspect, superconductor 84 may include a diameter of 0.1 mm or less. In this manner, protective tube 82 may include an outer diameter of about 1.3-mm. Existing protective tubes are about 3.2 mm in diameter. Hence, superconductor wire 84 may possess a carrying capacity and strength greater than copper or steel at about $1/5^{th}$ to about $1/16^{th}$ the density. Further, reducing the diameter of the protective tube results in a larger flow area through coiled tubing 54. Leading to reduced pressure drops, and the use of smaller downhole tools.

Exemplary embodiments contemplate introducing superconductor wire 86 into coiled tubing that may be resting on a spool in a manner similar to that described in U.S. Pat. Nos. 9,518,433 and 9,644,435 both of which are incorporated herein in their entirety. Introducing superconductor wire 86 into spooled coiled tubing presents many challenges including introduction force/pressure and slack management, especially for long wells and coiled tubing. For instance, currently, wells longer than 25,000-ft are being drilled. Servicing these wells with current coiled tubing telemetry technologies is impossible. Superconductor enhances an operator's ability to service and monitor these deeper wells. Superconductor wire 86 includes a modulus of rigidity and diameter that is distinct from existing conductors that are introduced into spooled coiled tubing in accordance with an exemplary aspect, superconductor wire 84 may be pushed or fed into coiled tubing twice the distance of conventional conductors using the same pressure. In this manner, superconductor 84 will provide operators with telemetry options at greater depths than are currently achievable with greater power being provided to downhole tools and/or sensors.

Set forth below are some embodiments of the foregoing disclosure:

Embodiment 1: A telemetry system for a resource exploration and recovery system including a tubular defining a flow bore, and a superconductor wire disposed within the flow bore.

Embodiment 2: The telemetry system according to any prior embodiment, further comprising: a protective tube extending along the tubular, the superconductor wire being disposed in the protective tube.

Embodiment 3: The telemetry system according to any prior embodiment, wherein the protective tube is formed from one of Inconel and an Inconel alloy.

Embodiment 4: The telemetry system according to any prior embodiment, wherein the superconductor comprises a nano-carbon tube wire.

Embodiment 5: The telemetry system according to any prior embodiment, further including one or more sensors electrically connected to the superconductor the one or more sensors include at least one of a pressure sensor, a temperature sensor, and a distance sensor.

Embodiment 6: The telemetry system according to any prior embodiment, further including one or more electrically operated tools connected to the superconductor wire.

Embodiment 7: The telemetry system according to any prior embodiment, wherein the one or more sensors and the one or more tools form part of a bottom hole assembly (BHA).

Embodiment 8: The telemetry system according to any prior embodiment, wherein the superconductor wire includes one of a modulus of rigidity less than about 74 GPA and a modulus of rigidity greater than about 90 GPA.

Embodiment 9: The telemetry system according to any prior embodiment, further including an optical fiber extending along the tubular, and a protective tube extending along the tubular, the superconductor wire and the optical fiber being disposed in the protective tube.

Embodiment 10: The telemetry system according to any prior embodiment, wherein the superconductor wire includes a diameter that is less than about 0.125-inches (3.2 millimeters).

Embodiment 11: A resource exploration and recovery system including a first system, a second system fluidically connected to the first system, and a telemetry system operatively connected to the first system extending into the second system, the telemetry system including a tubular defining a flow bore, and a superconductor wire disposed within the flow bore.

Embodiment 12: The resource exploration and recovery system according to any prior embodiment, further comprising: a protective tube extending along the tubular, the superconductor wire being disposed in the protective tube.

Embodiment 13: The resource exploration and recovery system according to any prior embodiment, wherein the protective tube is formed from a corrosion resistant steel alloy.

Embodiment 14: The resource exploration and recovery system according to any prior embodiment, wherein the superconductor comprises a nano-carbon tube wire.

Embodiment 15: The resource exploration and recovery system according to any prior embodiment, further including one or more sensors electrically connected to the superconductor wire wherein the one or more sensors include at least one of a pressure sensor, a temperature sensor, a distance sensor, a force sensor, a torque sensor, a pH sensor, and an azimuth sensor.

Embodiment 16: The resource exploration and recovery system according to any prior embodiment, further comprising: one or more electrically operated tools connected to the superconductor wire.

Embodiment 17: The resource exploration and recovery system according to any prior embodiment, wherein the one or more sensors and the one or more tools form part of a bottom hole assembly (BHA).

Embodiment 18: The resource exploration and recovery system according to any prior embodiment, wherein the superconductor wire includes one of a modulus of rigidity less than about 74 GPA and a modulus of rigidity greater than about 90 GPA.

Embodiment 19: The resource exploration and recovery system according to any prior embodiment, further comprising: an optical fiber extending along the tubular, and a protective tube extending along the tubular, the superconductor wire and the optical fiber being disposed in the protective tube.

Embodiment 20: The resource exploration and recovery system according to any prior embodiment, wherein the superconductor wire includes a diameter than is less than about 0.125-inches (3.2 millimeters).

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first,"

"second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well intervention operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A telemetry system for a resource exploration and recovery system comprising:
   a tubular defining a flow bore;
   a protective tube having a passage extending through the flow bore; and
   a superconductor wire and an optical fiber disposed within the passage, the superconductor wire being configured to transmit electrical power downhole to a downhole electrically powered tool and the optical fiber being configured to pass signals from one or more downhole devices in an uphole direction.

2. The telemetry system according to claim 1, wherein the protective tube is formed from one of Inconel and an Inconel alloy.

3. The telemetry system according to claim 1, wherein the superconductor wire comprises a nano-carbon tube wire.

4. The telemetry system according to claim 1, further comprising: one or more sensors electrically connected to the superconductor wire, the one or more sensors include at least one of a pressure sensor, a temperature sensor, and a distance sensor.

5. The telemetry system according to claim 4, wherein the one or more sensors and the electrically powered tool form part of a bottom hole assembly (BHA).

6. The telemetry system according to claim 5, wherein the superconductor wire provides power to and transmits signals between the BHA and the telemetry system.

7. The telemetry system according to claim 1, wherein the superconductor wire includes one of a modulus of rigidity less than about 74 GPA and a modulus of rigidity greater than about 90 GPA.

8. The telemetry system according to claim 1, wherein the superconductor wire includes a diameter that is less than about 0.125-inches (3.2 millimeters).

9. A resource exploration and recovery system comprising:
   a first system;
   a second system fluidically connected to the first system; and
   a telemetry system operatively connected to the first system extending into the second system, the telemetry system comprising:
   a tubular defining a flow bore;
   a protective tube having a passage extending through the flow bore; and
   a superconductor wire and an optical fiber disposed within the passage, the superconductor wire being configured to transmit electrical power downhole to a downhole electrically powered tool and the optical fiber being configured to pass signals from one or more downhole devices in an uphole direction.

10. The resource exploration and recovery system according to claim 9, wherein the protective tube is formed from a corrosion resistant steel alloy.

11. The resource exploration and recovery system according to claim 9, wherein the superconductor comprises a nano-carbon tube wire.

12. The resource exploration and recovery system according to claim 9, further comprising: one or more sensors electrically connected to the superconductor wire wherein the one or more sensors include at least one of a pressure sensor, a temperature sensor, a distance sensor, a force sensor, a torque sensor, a pH sensor, and an azimuth sensor.

13. The resource exploration and recovery system according to claim 12, wherein the one or more sensors and the electrically operated tool form part of a bottom hole assembly (BHA).

14. The resource recovery and exploration system according to claim 13, wherein the superconductor wire provides power to and transmits signals between the BHA and the telemetry system.

15. The resource exploration and recovery system according to claim 9, wherein the superconductor wire includes one of a modulus of rigidity less than about 74 GPA and a modulus of rigidity greater than about 90 GPA.

16. The resource exploration and recovery system according to claim 9, wherein the superconductor wire includes a diameter than is less than about 0.125-inches (3.2 millimeters).

* * * * *